(12) United States Patent
Tay et al.

(10) Patent No.: US 6,793,822 B2
(45) Date of Patent: Sep. 21, 2004

(54) AEROBIC BIOMASS GRANULES FOR WASTE WATER TREATMENT

(75) Inventors: Joo Hwa Tay, Singapore (SG); Stephen Tiong Lee Tay, Singapore (SG); Kuan Yeow Show, Singapore (SG); Yu Liu, Singapore (SG); Volodymyr Ivanov, Singapore (SG)

(73) Assignees: Sut Seraya PTE Ltd., Singapore (SG); Nanyang Technological University, Singapore (SG)

( * ) Notice: Subject to any disclaimer, the term of this patent is extended or adjusted under 35 U.S.C. 154(b) by 113 days.

(21) Appl. No.: 10/081,700

(22) Filed: Feb. 22, 2002

(65) Prior Publication Data

US 2003/0159991 A1 Aug. 28, 2003

(51) Int. Cl.[7] .................................................. C02F 3/00
(52) U.S. Cl. ........................ 210/610; 210/611; 210/615; 210/616; 210/620
(58) Field of Search ................................. 210/610, 611, 210/615–616, 620, 189

(56) References Cited

U.S. PATENT DOCUMENTS

| | | | |
|---|---|---|---|
| 4,566,971 A | 1/1986 | Reimann et al. | 210/616 |
| 5,151,197 A | 9/1992 | Smith et al. | 210/758 |
| 5,228,997 A | 7/1993 | Martin et al. | 210/610 |
| 5,275,733 A | 1/1994 | Burnham | 210/609 |
| 5,417,861 A | 5/1995 | Burnham | 210/609 |
| 5,895,576 A | 4/1999 | Yamasaki et al. | 210/614 |
| 5,985,150 A | * 11/1999 | Versprille et al. | 210/626 |
| 6,048,459 A | 4/2000 | Khudenko | 210/617 |

FOREIGN PATENT DOCUMENTS

WO   WO 96/10542   4/1996

OTHER PUBLICATIONS

Tay et al., "The effects of shear force on the formation, structure and metabolism of aerobic granules," *Applied Microbiol. Biotechnol.* 57(1–2):227–233, Oct. 2001.

Tay et al., "The role of cellular polysaccharides in the formation and stability of aerobic granules," *Letters in Applied Microbiology* 33(3):222–226, Sep. 2001.

Tay et al., "Microscopic observation of aerobic granulation in sequential aerobic sludge blanket reactor,"*J. Appl. Microbiol.* 91(1): 168–175, Jul. 2001.

* cited by examiner

*Primary Examiner*—Chester T. Barry
(74) *Attorney, Agent, or Firm*—Seed IP Law Group PLLC

(57) ABSTRACT

The method of producing aerobic biogranules for the treatment of waste water comprising the steps of: a) introducing waste water into a reactor; b) seeding the reactor with a active biomass material; c) supplying the oxygen-containing gas to the reactor to provide a mixing action to the suspension of biomass material in said waste water, the supply of oxygen-containing gas providing a superficial upflow gas velocity greater than 0.25 cm/s; d) initiating a period of nutrient starvation of the biomass material while continuing to supply oxygen-containing gas; e) allowing formed aerobic granules to settle in a settling zone in said reactor; f) discharging at least a portion of the waste water; g) repeating steps (a) to (f) until at least a portion of the biogranules in said settling zone are within a predetermined properties; and h) recovering said biomass granules within those predetermined properties.

15 Claims, 4 Drawing Sheets

Fig. 3 COD removal curves at day 8 (o) and day 20 (●) in R2 fed with acetate.

Fig. 4. Changes in hydrophobicity of cell surface with operation time in R2 fed with acetate.

AEROBIC BIOMASS GRANULES FOR WASTE WATER TREATMENT

BACKGROUND OF THE INVENTION

1. Field of the Invention

This invention relates to the production of the biomass of aerobic granules for the treatment of waste water.

In the treatment of waste waters by oxidative biological purification in aerobic granular sludge blanket (AGSB) reactors, waste water flows in an upward direction through an oxidation chamber in which micro-organisms are present. Movement of the suspension of waste water and micro-organisms within the waste water chamber is provided by the introduction of an oxygen-containing gas which also serves to mix the suspension of biological material and waste water. Within the reactors are inner zones of regulated settling which cooperate in the removal or accumulation of granules of a specifed size range.

Other types of oxidative reactors which rely on the introduction of an oxygen-containing gas at the bottom of an oxidation chamber doubling up through waste water to be treated are generally referred to as uplift reactors. Such reactors are generally seeded with an active biological sludge which consumes contaminants within the waste water thus reducing the level of those contaminants and producing biomass which can later be removed from the reactor for recycle, or other uses, or disposal.

One such reactor is disclosed in U.S. Pat. No. 5,985,150 assigned to Biothane Systems International B.V. In this patent, there is disclosed an uplift reactor in which unsupported granular sludge is used to treat waste water. In this reference the sludge is introduced either as a supported or unsupported sludge into the reactor and waste water and an oxygen-containing gas supplied through the bottom of the reactor. The granular sludge is carried with the upwardly flowing gas into a settling region where a portion of the waste water is separated from the sludge and the remaining suspension returned to the oxidation chamber.

One problem with oxidative waste water treatment in reactors of this type is the lack of cohesion between the unsupported biomass thus making the handling of the biomass generally difficult. In particular, removing the biomass from the treated waste water and producing biomass which is suitably robust to be used as a seed for other reactors, has proved to be difficult.

However despite the difficulties in handling unsupported aerobic biomass granules it is recognised that the use of such granules over supported biomass granules generally has the potential to improve the purification efficiency of reactors thus allowing the use of smaller reactor systems. If the biomass of aerobic granules can also be produced to a commercially acceptable level, it is expected that the use will reduce suspension and mixing energy requirements and give rise to less erosion of equipment. However it has been difficult to produce the biomass of aerobic granules or biogranules of a sufficient size with adequate physical properties to be used effectively in aerobic uplift reactors.

It is an object of the present invention to provide a method of production of aerobic biogranules which can be used in the treatment of waste water.

SUMMARY OF THE INVENTION

The present invention is directed to a method of producing aerobic granules under controlled conditions for the treatment of waste water. The method comprising the steps of:

a) introducing waste water into a reactor containing an active biomass;

b) supplying an oxygen-containing gas to the reactor to provide a mixing action and transfer of dissolved oxygen into the sludge in the waste water, the supply of oxygen-containing gas providing a superficial upflow gas velocity above 0.25 cm/s;

c) initiating a period of nutrient starvation in the reactor while continuing to supply oxygen-containing gas;

d) allowing formed aerobic granules to settle;

e) discharging and replacing at least a portion of the waste water;

f) repeating steps (a), (b), (c), (d) and (e) until the granules have predetermined physical properties; and g) recovering biomass granules within those predetermined properties.

The applicants have found that aerobic granules suitable for uplift reactors and particular AGSB reactors may be formed under the above conditions without the need for the use of carrier materials.

It is believed that the starvation period in the reactor under shear conditions causes the biomass to agglomerate forming much more robust granules.

In another aspect of the invention, there is provided aerobic biogranules for waste water treatment having physical characteristics suitable for use in uplift reactors. Preferably these physical characteristics include a roundness aspect between 0.0 to 3.0, density between 1.004 to 1.85 $g/cm^3$, and average particle size between 100 and 10,000 $\mu$m.

Preferably the distance from any position within the biogranules to the outer surface of the biogranules is less than 800 $\mu$m. Thus for perfectly spherical biogranules the maximum diameter is 1600 $\mu$m.

DETAILED DESCRIPTION OF THE PREFERRED EMBODIMENT OF THE INVENTION

While the invention will now be described with reference to the production of aerobic biogranules in specific media, it would be readily recognised by those skilled in the art that the invention is applicable to the production of aerobic biogranules in any waste water system.

Due to the nature of bacterial degradation in waste waters, those bacteria which are best adapted to the particular media will proliferate while those without the ability to metabolise material in the media will not be dominant. Hence the inoculant for the process need only contain a range of bacteria.

Figure 1:
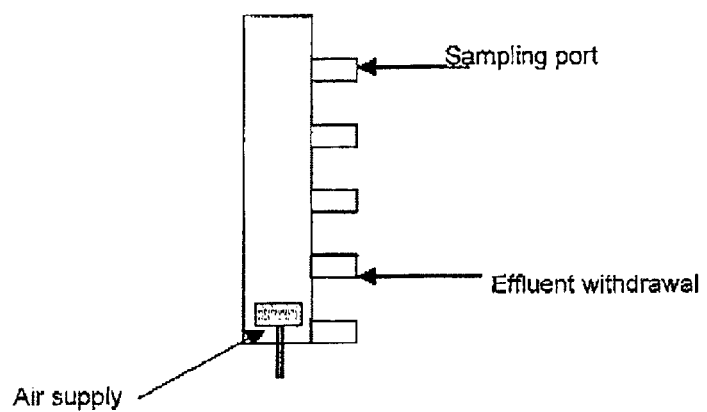
FIG. 1 is a schematic diagram of a column-type reactor used to perform the method of the invention.

In a typical method according to the invention, a reactor similar to FIG. 1 is fed with waste water and an active biomass sludge. The preferred method as illustrated in FIG.

2 involves initially step 1 of feeding the suspension of waste water and sludge without the supply of an oxygen containing gas.

The second step involves supplying an oxygen containing gas to cause the biomass to undergo oxidative respiration while under the shear conditions provided by the supply of gas.

Figure 2:
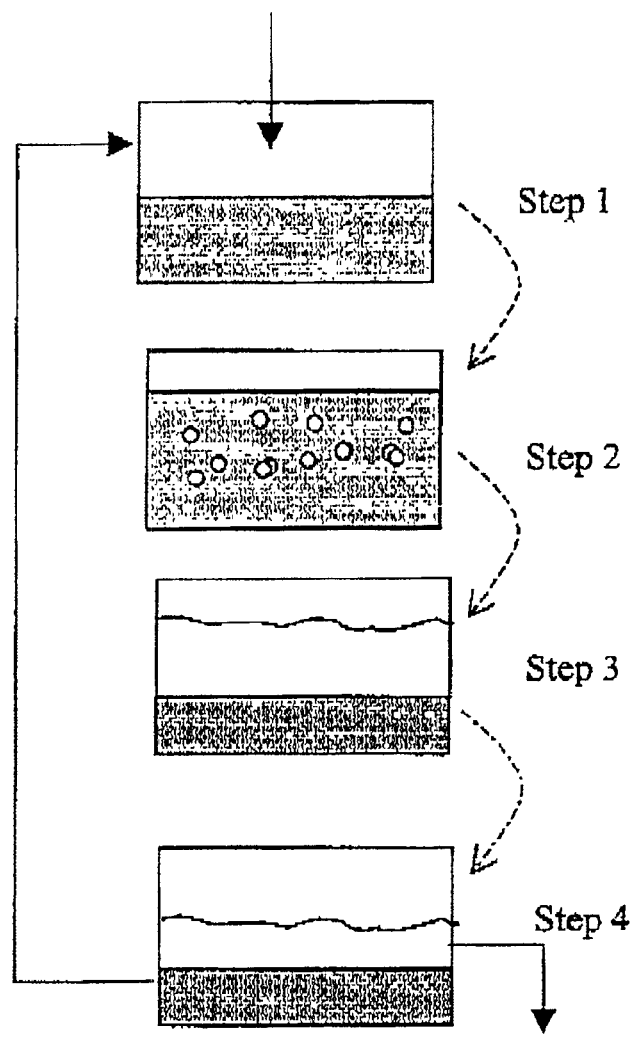
FIG. 2 is a process flow diagram of the method of the invention.

The third step shown in FIG. 2 involves stopping the supply of gas and allowing the biomass to settle, followed by the fourth step of discharging the supernatant and recycling the biomass to step 1.

Two column-type reactors 10 (1.2 m height) with a working volume of 2.4 l were used for sequential aerobic sludge blanket systems (both reactors had the same geometrical configuration, as shown in FIG. 1, and the internal diameter of the reactor was 5 cm). The reactors were fed with waste water and started up by adding an active biomass sludge. In the examples 800 ml of municipal activated sludge (3000 suspended solids per liter) was added. Reactor 1 (R1) was fed with glucose as sole carbon source and reactor 2 (R2) with acetate as sole carbon source. Other operation conditions were kept the same for both reactors. Effluent was drawn at the middle port 12 of the column 10. The reactor was operated for 4 h per cycle with an hydraulic retention time (HRT) of 8 h and a substrate loading rate of 6.0 kg chemical oxygen demand (COD) $m^{-3}$ per day was applied. The filling and withdraw time were each 5 min, the settling time was varied fom 20 to 1 min and the remainder was the reaction time. No idling time was applied in the present research. The mean sludge retention time was 7 d in R1 and 9 d in R2. Sludge wastage was performed through effluent discharge. An oxygen containing gas which in the ca-e of the examples was introduced through an air diffuser 11 by an air pump in the bottom of the column and controlled by a mass flow controller. An air flow rate of 3.0 l $min^{-1}$ was applied. This gave a superficial gas velocity of 0.025 m $s^{-1}$ Media The composition of the synthetic waste water was as follows: glucose, 1400 mg $l^{-1}$; peptone, 400 mg $l^{-1}$, meat extract (Laboratory-Lemco, Oxoid Ltd, Basingstoke, UK), 250 mg $l^{-1}$; $NH_4CL$, 200 mg $l^{-1}$; $K_2HPO_4$, 45 mg $l^{-1}$; $CaCl_2 2H_2O$, 30 mg $l^{-1}$, $MgSO_4$ $7H_2O$, 25 mg $l^{-1}$ $FeSO_4 7H_2O$, 20 mg $l^{-1}$ and microelement solution, 1.0 ml $l^{-1}$. The carbon source was substituted by acetic acid (1875 mg $l^{-1}$) in R2. This gave a COD of 2000 mg $l^{-1}$. The microelement solution contained (g $l^{-1}$): $_3BO_3$, 0.05; $ZnCl_2$, 0.05; $CuCl_2$, 0.03; $MnSO_4 H_2O$, 0.05; $(NH_4)_6Mo_7O_{24} 4H_2O$, 0.05; $AlCl_3$, 0.05; $CoCl_2 6H_2O$, 0.05 and $NiCl_{25}$ 0.05 (Tay and Yan 1996). The influent pH value was adjusted to 7.0 by the addition of $NaHCO_3$ and $H_2SO_4$.

The effluent was analysed for COD and the sludge sample for mixed liquor suspended solids (MLSS), mixed liquor volatile suspended solids (MLVSS), sludge volume index (SVI) and specific oxygen utilization rate (SOUR) by following a standard method (APHA 1995) Standard methods for the examination of water and waste water, 19th edn, Washington DC: American Public Health Association. The granule size was measured by a laser particle size analysis system (MasterSizer Series 2600; Malvern Instruments Ltd, Malvern, Worcestershirw, UK) when the size was less than 1880 pm or an image analysis system (Quantimer 500 Image Analyser; Leica Cambridge Instruments GmbH, 4 Nubloch, Germany) when the size was greater than 1880 $\mu$m. Microbial observation was conducted by using either microscopy or image analysis (IA). The microbial compositions of granules were observed qualitatively with a scanning electron microscope (SEM) (Steriosan 420; Leica Cambridge Instruments). The granule samples were gently washed with phosphate buffer solution and allowed to settle naturally. The granules were then fixed with 4% paraformaldehyde and left for 4 h. The fixed granules were dehydrated by successive passages through 40, 60, 80 and 100% ethanol and then dried either by Freeze Dryer (Edwards, Crawley, West Sussex, UK) or Critical Points Dryer (E3000) (VG Microtech, East Grinstread, West Sussex, UK) and finally observed by SEM. The biomass density was measured by following the method of Beun et al. (1999), "Aerobic granulation in a sequencing bath reactor", *Water Research* 33,2283–2290. Cell hydrophobicity was determined by the method described by Rosenberg et al (1980), "Adherence of bacteria to hydrocarbons; a simple method for measuring cell-surface hydrophobicity", *FEMS Microbiology Letters* 9, 29–33. Hexadecane (0.25 ml) was used as the hydrophobic phase. The hydrophobicity was expressed as the percentage of cells adhering to the hexadadecene after 15-min partitioning. Granule strength was measured by following the method of Ghangrekar el at. (1996) Experience with UASB reactor start-up under different operating conditions, *Water Science and Technology* 34, 421–428 and expressed in terms of the integrity coefficient (%), which is defined as the ratio of the residual granule volatile suspended solid (VSS) and the total VSS after a certain period of shaking.

The evolution of aerobic granulation was monitored by means of optical microscopy, an IA technique and SEM during the operation of two sequential aerobic sludge blanket reactors fed with glucose and acetate, respectively. The physical characteristics and microbial activity of sludge in terms of SVI, settling velocity, size, hydrophobicity, SOUR, strength and roundness were also determined during the experiments.

Seed sludge

Microscopic examination of seed sludge taken from a local municipal waste water treatment plant showed a typical morphology of conventional activated sludge, in which filaments are observed. A SEM micrograph further revealed that the seed sludge had a very loose and irregular three-dimensional structure. The average floc size of the seed sludge was around 70 $\mu$m with an SVI value of 280 ml $g^{-1}$. As SVI values of activated sludge about 150 ml $g^{-1}$ are typically associated with filamentous growth, the seed sludge used seemed to be dominated by filamentous bacteria.

Characteristics of aerobic granules

The characteristics of aerobic granules at different stages and seed sludge were determined. Seed sludge had a mean diameter of 70 $\mu$m with an SVI value of 280 ml gel. Many filamentous bacteria were present in the seed sludge. One week after start-up, the SVI had decreased to 190 ml $g^{-1}$ in R1 and 178 ml $g^{-1}$ in R2 and compact aggregates were observed in both reactors (FIG. 2). One week later, the SVI had further decreased to 125 ml $g^{-1}$ in R1 and 114 ml $g^{-1}$ in R2 and the filamentous bacteria had disappeared in R2. Granular sludge at this stage had a much more compact and dense structure than seed sludge and 1-week old aggregates. With the operation proceeding, by the third week mature and round shaped granules with a clear boundary prevailed in the reactors and no visibly suspended biomass was present. After 1 min of settling, the mature granules had all settled, leaving a very clear supernatant fluid in the reactors. The SVI values of the mature granules were 51–85 ml $g^{-1}$ in R1 and 50–80 ml $g^{-1}$ in R2. These results clearly show that sludge settleability improves significantly as the granulation progresses.

The biomass concentration in the reactors gradually increased after start-up. After operation for 3 weeks, a stable concentration of 5.9 g MLSS $l^{-1}$ in R1 and 8.6 g MLSS $l^{-1}$ in R2 was reached. The mature granules from R1 still had filamentous bacteria extruding from the granule surface. However, the mature granules from R2 had a smooth surface as few filaments were observed. Glucose-fed granules had a mean diameter of 2.4 mm, with a range of 1.0–3.0 mm, while granules grown on acetate had a mean diameter of 1.1 mm, with a range of between 0.5 and 1.5 mm. The microbial diversities of the glucose-and acetate-fed granules were different and the glucose-fed granules mainly consisted of coccoid bacteria in the internal part of the granule and some rod-like bacteria at the surface, with filaments tangled together; however, rod-like bacteria were predominant in whole acetate-fed granules.

The mature granules cultivated in R1 and R2 were found to have very good settleability. The settling velocity was 35 m h$^{-1}$ for glucose-fed granules and 30 m h$^{-1}$ for acetate fed granules. This settling velocity of aerobic granules is comparable with that of anaerobic granules cultivated in upflow anaerobic sludges blanket reactor (UASB). Results further showed that the mature granules had a dry biomass density of 41.1 g l$^{-1}$ in R1 and 32.2 g l$^{-1}$ in R2. The biomass densities of granules reached in R1 and R2 were relatively low compared with granules obtained in a sequencing batch airlift reactor (48 g l$^{-1}$). Higher settling velocity and biomass density of aerobic granules would result from the denser microbial structure. In biological systems, biomass serves as the biocatalyst for the degradation of organic matter. Obviously, a high retainable biomass in the reactor would ensure a faster and more efficient removal of organic pollutants, while excellent settling granules are essential for the good functioning of biological systems treating waste water.

The aerobic granules fed with glucose and acetate exhibited comparable microbial activity, in terms of SOUR, to conventional activated sludge, 69.4 mg $O_2g^{-1}$ MLVSS h$^{-1}$ for glucose fed mature granules and 55.9 mg $O_2g^{-1}$ MLVSS h$^{-1}$ for acetate-fed mature granules. In addition, the mature granules cultivated in both reactors had high physical strength and roundness. The roundness of a granule is calculated as $4\pi area/perimeter^2$ in which perimeter is the length of the granules outline. Aspect ratio is the ratio between the major axis and the minor aspect of an ellipse equivalent to the granule (0=line, 1=circle). The characteristic data of both glucose-and acetate-fed mature granules are summarized in Table 1. The systems were run very stably for more than 3 months before the experiments were stopped with a COD removal efficiency of around 97% at steady state when a loading rate of 6.0 kg COD m$^{-3}$ d$^{-1}$ was applied. The resulting aerobic biogranules are particularly well suited to use as seed in AGSB reactors.

TABLE 1

Characteristics of glucose- and acetate-fed mature aerobic granules

|  | Glucose | Acetate |
| --- | --- | --- |
| Average diameter (mm) | 2.4 | 1.1 |
| SVI (ml g$^{-1}$) | 51–85 | 50–80 |
| Settling velocity (m h$^{-1}$) | 35 | 30 |
| Biomass concentration in reactor (g l$^{-1}$) | 5.9 | 8.6 |
| Granule densitv(g l$^{-1}$) | 41.1 | 32.2 |
| Granule strength (%) | 98.2 | 97.1 |
| Average aspect ratio* | 0.79 | 0.73 |
| SOUR (mg $O_2$ g$^{-1}$ h$^{-1}$) | 69.4 | 55.9 |
| COD removal efficiency (%) | 97 | 98 |

*Roundness of the particle (0 = line 1 = circle)
SVI. Sludge volume index; SOUR. specific oxygen utilization rate; COD.

The SBR system operates in a sequencing cycle of feeding, aeration, settling and discharging of supernatant fluid. As a result micro-organisms growing in the SBR system are subjected to a periodical operation cycle.

Figure 3:
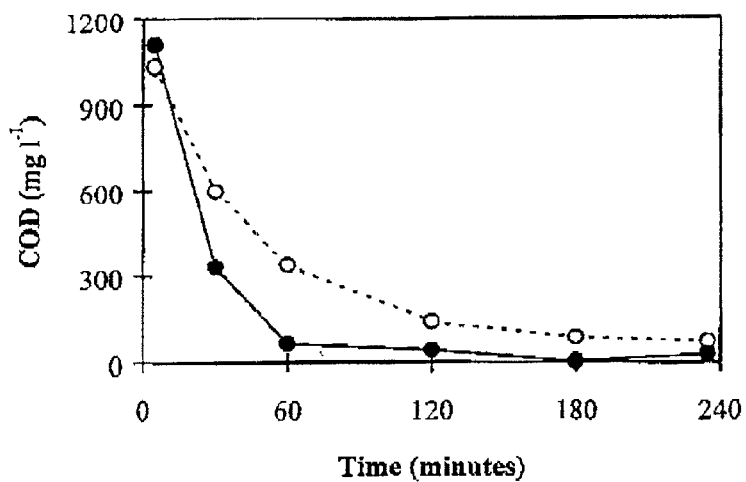
FIG. 3 is a graph of a COD removal during waste water treatment.

The degradation time needed to reduce substrate concentration to a minimum was determined during SBR operation. The degradation time displayed a significant reducing trend with the increase in the operation cycles. In R2 fed with acetate, FIG. 3 shows that the time for COD reduction from 1000 to 100 mg l$^{-1}$ decreased from 3 h at day 8 to 1 h at day 20. For a given aeration period, it appeared that a starvation phase existed during SBR operation. Thus, the aeration time period indeed consisted of two consecutive phases, a degradation phase in which the substrate was depleted to a minimum, followed by an aerobic starvation phase in which the external substrate was no longer available for micro-organisms. It is believed that 80% of the aeration period was in a state of aerobic starvation.

Figure 4:
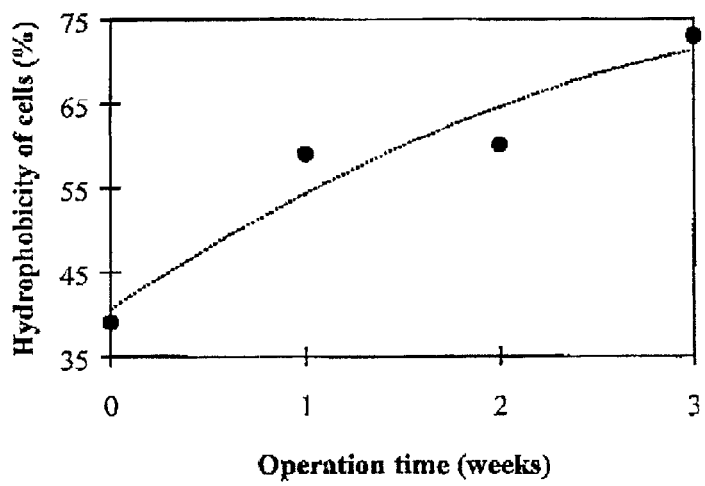
FIG. 4 is a graph of the changes in hydrophobicity of the cell surface over operation time.
Figure 5:
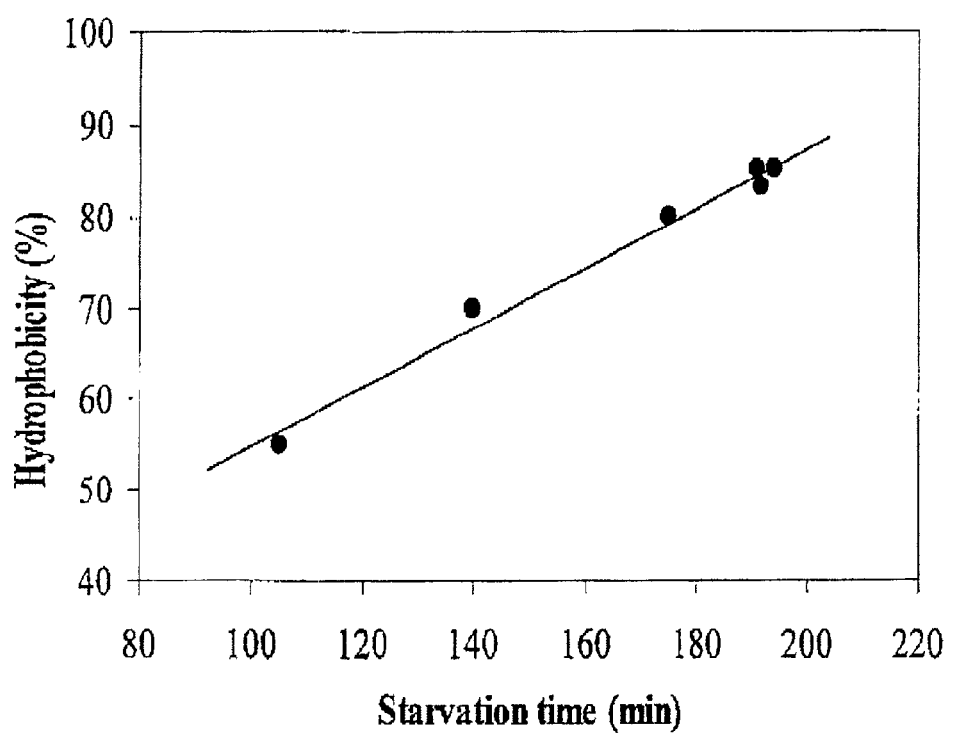
FIG. 5 is a graph showing the changes in hydrophobicity as a function of starvation time.

It is believed that under starvation conditions, bacteria became more hydrophobic which, in turn, facilitated microbial adhesion and aggregation. Aggregation can be regarded as an effective strategy of cells against starvation. FIG. 4 shows changes in the hydrophobicity of the cell surface observed in R2 fed with acetate. As can be seen in FIG. 4, the seed sludge had a hydrophobicity of 39% and the hydrophobicity of the cell surface increased to 73% after the formation of aerobic granules at week 3. A similar trend was also observed in R1 fed with glucose. It is believed that the hydrophobicity of the cell surface is an impo rtant affinity force in the self-immobiiization and attachment of cells.

Without wishing to be restricted to theory, in a thermodynamic sense, increasing the hydrophobicity of cell surfaces causes a decrease in the excess of Gibbs energy of the surface and further results in higher cell-to-cell interaction strength as well as a dense and stable structure. Consequently, starvation-induced changes in the characteristics of the cell surface and morphology seem to be in favour of the formation of strong microbial aggregation.

As mentioned above, the applicants believe periodical starvation in sequencing batch reactor (SBR) systems serves as a trigger for microbial granulation in activated sludge. However, the contribution of other operation conditions should preferably be controlled especially hydrodynamic shear and flow pattern in the reactor. Turbulence caused by upflow air aeration may act as the main hydraulic shear in a column-type SBR system, and can be approxinately described by superficial air velocity.

In order to verify the effect of hydrodynamic shearing force on aerobic granulation, the SBR system of FIG. 1 fed with glucose was started up with two different superficial air velocities of 0.008 and 0.025 m s$^{-1}$, respectively. It was found that, when the SBR operated at a lower superficial air velocity of 0.008 m s$^{-1}$, no granules were observed in the system, but only fluffy flocs. However, regular shaped granules were successfully cultivated in the SBR operated at a high superficial air velocity of 0.025 m s$^{-1}$ and preferably above 0.03 m s$^{-1}$. However, at a relatively high superficial air velocity of 0.041 m s$^{-1}$, granulation occurred and, because of the high shear strength, smooth, dense and stable aerobic granules were formed. According to the thermodynamic laws, the hydraulic shearing force in SBR, which is caused by upflow aeration, could force those periodical starvation-triggered denser aggregates to be shaped as regular granules, which have minimum surface free energy.

The microbial granules were cultured in a sequencing batch reactor with a medium containing glucose as the main source of carbon, as described earlier. Average diameter was 2.4 mm. Settling time was 2 min. Three 16S rRNA-targeted oligonucleotide probes were used to study the structure of the granules by FISH. The Eub338 probe with the sequence 5'-GCTGCCTCCCGTAGGAGT-3' was labeled with the fluorochrome CY2 and used to detect Bacteria. The Bacto 1080 probe with the sequence 5'- GCACTTAAGCCGA-CACCT -3' was specific for Bacteroides spp. (as described in Sghir et al., 2000) Quantification of bacterial groups within human fecal flora by oligonucleotide probe hybridization, *Applied and Environmental Microbiology* 66:2263–2266 and was labeled with the fluorochrome CY5. The Nsm156 probe contained the sequence 5'-TATTAGCACATCTTTCGAT-3' and was often used for the detection of ammonium-oxidizing bacteria from the Nitrosomonas cluster. This probe was labeled with tetrachlorofluorescein (TET). All probes were purchased from Research Biolabs, Singapore. Granules were cut with a cryomicrotome (Leica FISH (Kim and Ivanov, 2000). 10 µl of probe solution was added into the well. Final concentrations of the probes in the hybridization buffer were as follow: Eub338, 110 pmol·ml$^{-1}$; Bacto1080, 305 pmol·m$^{-1}$, Nsm156, 130 pmol·m$^{-1}$. The specimens were incubated for 4 h at 50° C., and the hybridization solution contained 50% formamide. These conditions have been optimized for the specific binding of Eub338 and Nsm156 probes (Kim and Ivanov, 2000). Because the Eub338 and Bacto1080 probes had similar melting temperature, FISH was performed simultaneously with these two probes. The probes were washed out after hybridization with 1 ml of washing buffer (hybridization buffer without formamide) for 2 h at 50° C. because the recommended wash temperatures were 54° C. for Eub probe, 50° C. for Bacto1080 probe, and 48° C. for Nsm156 probe. To detect the exopolysaccharide (EPS) matrix in the granule, FITC-labeled lectin (ConA-FITC) from *Canavalia ensiformis* (Sigma, USA) was applied. A LIVE/DEAD® BacLight Bacterial Viability Kit (Molecular Probes, OR, USA) was used to detect dead cells. To detect channels and pores with diameters geater than 0.1 µm, granules were incubated for 4 h with a suspension of 0.1 µm TetraSpec Fluorescent Microsphere Standards (Molecular Probes, OR, USA). Final concentration of the microspheres was 2·10$^8$ particles·ml$^{-1}$.

The granule images were acquired by a Fluoview300 confocal laser scanning microscope (CLSM) (Olympus, Japan). Green and red fluorescence were excited by a 10 mW argon laser at 488 nm, separated with a 570 nm splitting filter and detected in channel 1 with a longpass filter 510 nm and in channel 2 with a bandpass filter 580nm–640 nm. Red fluorescence from CY5 was excited by a helium neon laser at 633 nm and measured in channel 2 with a longpass filter 660 nm.

The edges of the granule were detected by analyzing the intensity of the light through the granule. The aerobic layer in the granule was detected by the presence of obligate aerobic ammonium-oxidizing bacteria Nitrosomonas spp. This layer was situated at a depth of 70–100 µm from the edge of the granule. Aerobic conditions in the interior of the granule were likely supported by the transport of oxygen through channels and pores. Channels and pores were detected in the granule and porosity values peaked at depths of 300–500 µm from the granule surface.

The anaerobic layer in the aerobically grown granule was detected by the presence of obligate anaerobic bacteria Bacteroides spp. This layer was situated at a depth of 800–900 µm from the surface of the granule. The layer of anaerobic bacteria was followed by a layer of dead microbial cells at a depth of 800–1000 µm from the surface of the granule. Anaerobiosis and cell death in the granule interior was probably promoted by the formation of polysaccharide plugs in the channels and pores. These plugs diminished the mass transfer rate of both nutrients and metabolites. Polysaccharide formation peaked at a depth of 400 µm from the surface of the granule.

Diffusion limitation in microbial aggregates may be overcome by the formation of channels and pores that interconnect the surface and the interior. The aerobic granules in these examples also contain channels and pores that penetrated to depths of 900 µm from the surface of the granule. The anaerobic layer formed when the porosity and channelling in the granule interior receded. Generally, the depth of the anaerobic layer depends on the microbial metabolic activity and transport of oxygen through the channels and the pores. Plugging of these channels and pores by polysaccharides will likely promote the formation of the anaerobic layer. The central core of the granule consisted of dead cells. Cell death was probably caused by diffusion limitation and could also be promoted by the plugging of the channels with polysaccharides.

The detection of an anaerobic layer in aerobically grown granules can have application in the size optimization of these granules. Large granules are likely to contain significant numbers of anaerobic bacteria, and the associated gases and organic acids produced during anaerobic fermentation can lead to the destruction of these granules. Therefore, the optimal diameter for the aerobic granules is proposed to be less than 1,600 µm. This is twice the distance fron the granule surface to the anaerobic layer.

While the invention has been illustrated with reference to specific media, any liquid media can be treated to reduce the chemically and biologically oxidisable material therein.

What is claimed is:

1. A method of producing aerobic biogranules for the treatment of waste water comprising the steps of:
   a) introducing waste water into a reactor containing an active biomass sludge;
   b) supplying an oxygen-containing gas to the reactor to provide a mixing action and transfer of dissolved oxygen into the sludge in the waste water, the supply of oxygen containing gas providing a superficial upflow gas velocity above 0.25 cm/s;
   c) initiating a period of nutrient starvation in the reactor while continuing to supply oxygen-containing gas;
   d) allowing formed aerobic granules to settle;
   e) discharging and replacing at least a portion of the waste water;
   f) repeating steps (a), (b), (c), (d) and (e) until the granules have predetermined physical properties; and
   g) recovering biomass granules within those predetermied properties.

2. The method of claim 1 wherein the starvation period in the reactor is at least 75% of the reaction cycle.

3. The method of claim 1 wherein the steps (b) to (d) are the equivalent of a single reaction cycle, the reaction cycle being repeated a plurality of times to produce biogranules of the predetermined size.

4. The method of claim 1 wherein the flnw of oxygen-contaning gas into said reactor creates turbulent flow within the reactor.

5. The method of claim 1 wherein the superficial upflow gas velocity is above 0.3 cm/s and less than 3.6 cm/s.

6. The method of producing aerobic biogranules for the treatment of waste water comprising the steps of:
   a) introducing waste water into a reactor;
   b) seeding the reactor with an active biomass material;
   c) supplying oxygen containing gas to the reactor to provide a mixing action and oxygen to the suspension of biomass material in said waste water, the supply of oxygen-containing gas providing a superficial upflow gas velocity greater than 0.25 cm/s;

d) initiating a period of nutrient starvation of the biomass material while continuing to supply oxygen containing gas;

e) allowing formed aerobic granules to settle in a settling zone in said reactor;

f) discharging at least a portion of the waste water;

g) repeating steps (a) to (f) until at least a portion of the biogranules in said settling zone are within predetermined properties; and h) recovering said biomass granules with those predetermined properties.

7. The method of claim 6, wherein the superficial upflow gas velocity is greater than 0.3 cm/s and less than 3.6 cm/s.

8. The method of claim 6 wherein steps (c) and (d) are the aeration stage of a single reaction cycle, the starvation period lasting at least 75% of the aeration stage.

9. The method of claim 6 wherein the predetermined physical property is a roundness aspect of 0.0 to 3.0.

10. The method of claim 6 wherein the predetermined physical property is a density of between 1.004 to 1.85 g/cm$^3$.

11. The method of claim 6 wherein the predetermined physical property is an average particle size of between 100 and 10,000 $\mu$m.

12. The method of claim 6 wherein the distance from any part of the formed biogranule to the nearest surface is less than 800 $\mu$m.

13. The method of claim 6 wherein the maximum diameter is 1600 $\mu$m.

14. The method of claim 6 wherein the settling zone is non-aerated.

15. The method of claim 6 wherein the ratio between the biomass of selected biogranules and suspended smaller particles of the biomass is between 0.001 to 0.20.

* * * * *